(12) United States Patent
Takeshita et al.

(10) Patent No.: US 8,807,967 B2
(45) Date of Patent: Aug. 19, 2014

(54) BLOWER FAN

(75) Inventors: Hidenobu Takeshita, Kyoto (JP); Tomotsugu Sugiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 194 days.

(21) Appl. No.: 13/282,652

(22) Filed: Oct. 27, 2011

(65) Prior Publication Data

US 2012/0107156 A1 May 3, 2012

(30) Foreign Application Priority Data

Nov. 2, 2010 (JP) ................................. 2010-245907

(51) Int. Cl.
| | |
|---|---|
| *F04D 29/046* | (2006.01) |
| *F04D 29/056* | (2006.01) |
| *F04D 25/06* | (2006.01) |
| *H02K 1/18* | (2006.01) |
| *H02K 5/16* | (2006.01) |
| *H02K 7/14* | (2006.01) |

(52) U.S. Cl.
CPC ............ *H02K 5/161* (2013.01); *F04D 25/0606* (2013.01); *H02K 1/185* (2013.01); *H02K 5/163* (2013.01); *H02K 7/14* (2013.01)
USPC .................................................... 417/423.12

(58) Field of Classification Search
CPC ......... H02K 7/14; H02K 1/185; H02K 5/161; F04D 25/0653; F04D 25/0606
USPC ..................... 417/353, 423.12, 352, 423.15
See application file for complete search history.

(56) References Cited

U.S. PATENT DOCUMENTS

| | | | | |
|---|---|---|---|---|
| 6,664,683 | B1 * | 12/2003 | Yashiro et al. | 310/90 |
| 8,419,386 | B2 * | 4/2013 | Horng | 417/353 |
| 2004/0136842 | A1 * | 7/2004 | Obara et al. | 417/354 |
| 2007/0132327 | A1 * | 6/2007 | Brunet | 310/90.5 |
| 2009/0180901 | A1 | 7/2009 | Lee et al. | |

FOREIGN PATENT DOCUMENTS

CN        101487478 A      7/2009

* cited by examiner

*Primary Examiner* — Bryan Lettman
(74) *Attorney, Agent, or Firm* — Keating & Bennett, LLP (57) ABSTRACT

A blower fan includes a shaft including an outer circumferential surface, a rotor magnet arranged to rotate about a rotation axis together with the shaft, a stator arranged radially outwards of the rotor magnet in an opposing relationship with the rotor magnet, a substantially cylindrical holder unit arranged to rotatably support the shaft through a bearing, and an impeller arranged to rotate together with the shaft. The bearing includes a pair of axially spaced-apart bearing units. The rotor magnet and the stator are arranged between the bearing units. The bearing units and the stator are held on an inner circumferential surface of the holder unit.

20 Claims, 11 Drawing Sheets

BLOWER FAN

BACKGROUND OF THE INVENTION

1. Field of the Invention

The present invention relates to a blower fan and more specifically to a blower fan for use in, e.g., cooling an electronic device.

2. Description of the Related Art

Conventionally, an outer rotor type motor in which a rotor is arranged radially outwards of a stator has been extensively used as a motor for driving a blower fan. From the viewpoint of performance, the outer rotor type motor is greater in inertial moment and drive torque, which makes it easy to keep a rotational speed of the outer rotor type motor constant.

As the density of electronic parts arranged within a housing of an electronic device grows higher in recent years, the electronic device tends to generate an increased amount of heat. Thus, a need exists to increase the rotation speed of a blower fan for cooling the electronic device. However, the outer rotor type motor has a greater moment of inertia. Therefore, if the rotation speed of the blower fan is increased, the blower fan is likely to suffer from unbalanced rotation. This may possibly result in an increased vibration and may possibly pose a problem in terms of strength.

As a solution to this problem, an inner rotor type motor in which a rotor is arranged radially inwards of a stator may be used. Since the inner rotor type motor has a smaller moment of inertia than the outer rotor type motor, it becomes possible to increase the rotational speed of the blower fan.

Figure 11:
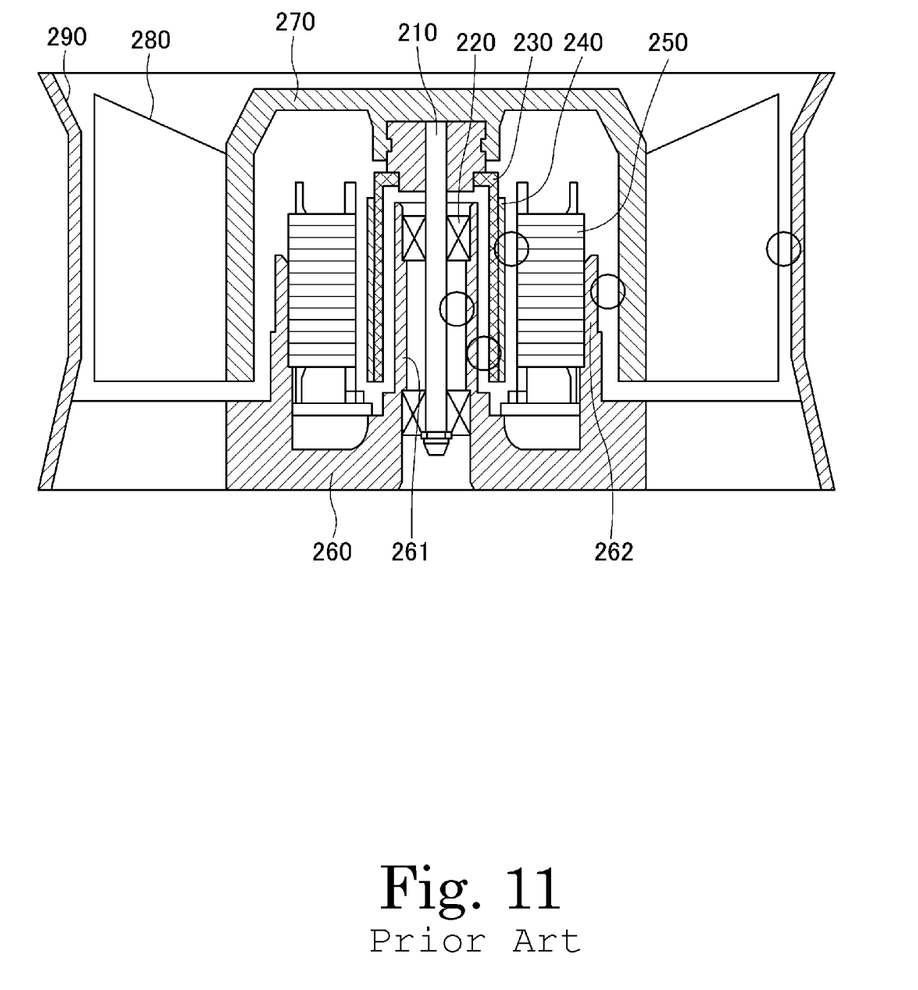
FIG. 11 is a section view showing the configuration of a conventional inner rotor type blower fan.

As one example of a blower fan employing an inner rotor type motor, US2009/0180901A discloses a blower fan including a motor support unit 260 in which a bearing holding unit 261 holding a bearing 220 and a stator holding unit 262 holding a stator 250 are continuously formed into a single piece (see FIG. 11).

In the conventional inner rotor type blower fan disclosed in US2009/0180901, as shown in FIG. 11, a rotor holder 230 (rotor magnets 240) and an impeller cup 270 (blades 280) as rotating bodies are arranged radially outwards of a shaft 210 as a rotation axis, between the bearing holding unit 261, the stator 250 (the stator holding unit 262) and a housing 290 as non-rotating bodies. In the conventional inner rotor type blower fan, therefore, specified spaces need to be provided radially outwards of the rotation axis, between the shaft 210 and the bearing holding unit 261, between the bearing holding unit 261 and the rotor holder 230, between the rotor magnets 240 and the stator 250, between the stator holding unit 262 and the impeller cup 270 and between the blades 280 and the housing 290 as indicated by circles in FIG. 11.

On the other hand, in an outer rotor type blower fan, a bearing holding unit, a stator, a rotor holder (rotor magnets) and an impeller cup (blades) are arranged radially outwards of a rotation axis. The bearing holding unit also serves as a stator holding unit. The impeller cup is press-fitted to the outer circumference of the rotor holder. In the outer rotor type blower fan, therefore, it is only necessary that specified spaces be provided radially outwards of the rotation axis, between the shaft and the bearing holding unit (the stator holding unit), between the stator and the rotor holder (the rotor magnets) and between the blades and the housing.

For the reasons stated above, the spaces to be provided between the non-rotating bodies and the rotating bodies arranged in the radial direction are increased in the inner rotor type blower fan as compared with the outer rotor type blower fan. This results in an increased radial dimension of the inner rotor type blower fan. Accordingly, there is a limit in how much the size of the inner rotor type blower fan can be reduced. In addition, the radial dimension of the impeller cup 270 with respect to the inner diameter of the housing 290 becomes greater which makes it impossible to secure a sufficient wind-tunnel area. As a consequence, it is impossible to sufficiently enhance the cooling capacity despite the increase in the rotation speed of the blower fan.

SUMMARY OF THE INVENTION

In view of the above, preferred embodiments of the present invention provide an inner rotor type blower fan capable of enjoying a reduction in size while also exhibiting an enhanced cooling capacity.

In an inner rotor type blower fan according to a preferred embodiment of the present invention, rotating rotor magnets are arranged between a pair of bearing units. A non-rotating stator is arranged radially outwards of the rotor magnets. The bearing units and the stator are preferably fixed to the inner circumferential surface of a substantially cylindrical holder unit.

In accordance with a preferred embodiment of the present invention, a blower fan includes a shaft; a rotor magnet arranged to rotate about a rotation axis together with the shaft; a stator arranged radially outwards of the rotor magnet in an opposing relationship with the rotor magnet; a substantially cylindrical holder unit arranged to rotatably support the shaft through a bearing; and an impeller arranged to rotate together with the shaft, the bearing including a pair of axially spaced-apart bearing units, the rotor magnet and the stator arranged between the bearing units, the bearing units and the stator being held on an inner circumferential surface of the holder unit.

With such a configuration, it is only necessary that the spaces existing between the non-rotating bodies and the rotating bodies be provided between the rotor holder and the stator, between the holder unit and the impeller, and between the impeller and the housing. Accordingly, it is possible to provide an inner rotor type blower fan that achieves a significantly reduced size and an enhanced cooling capacity.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

In the following description of the preferred embodiments of the present invention, the direction parallel or substantially parallel to a rotation axis will be defined as the "axial direction" and the direction perpendicular or substantially perpendicular to the rotation axis will be defined as the "radial direction". It should be noted that the present invention is not limited to the preferred embodiments described below but may be arbitrarily modified without departing from the scope of the present invention. In addition, the preferred embodiments disclosed herein may be combined with other preferred embodiments.

Figure 1:
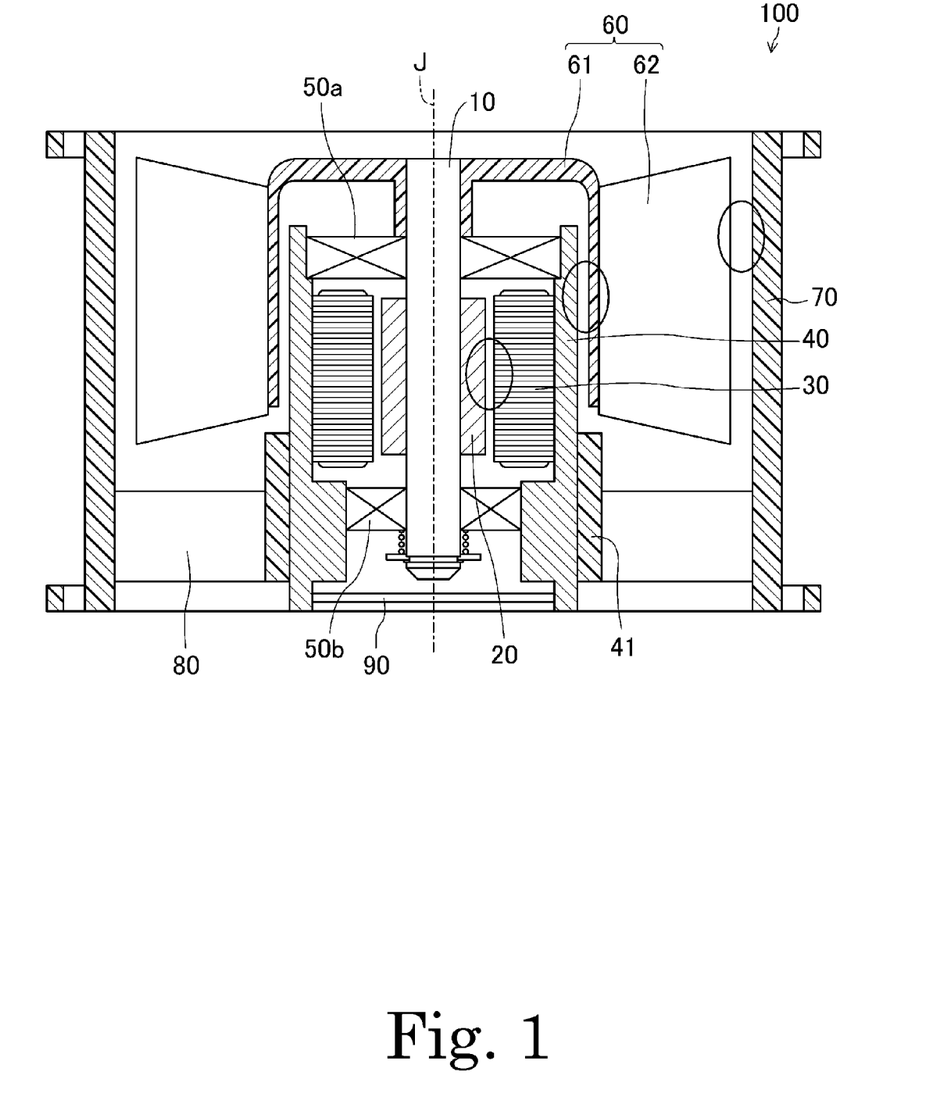
FIG. 1 is a section view showing the configuration of a blower fan according to a preferred embodiment of the present invention.

FIG. 1 is a sectional view showing the configuration of a blower fan 100 according to a preferred embodiment of the present invention. The blower fan 100 provides an axial flow fan provided with an inner rotor type motor.

As shown in FIG. 1, the blower fan 100 of the present preferred embodiment preferably includes a shaft 10, rotor magnets 20 arranged to rotate about a rotation axis J together with the shaft 10, a stator 30 arranged radially outwards of the rotor magnets 20 in an opposing relationship with the rotor magnets 20, a substantially cylindrical holder unit 40 arranged to rotatably support the shaft 10 through bearings and an impeller 60 arranged to rotate together with the shaft 10. Upon rotation of the impeller 60, an air is drawn from one axial side and discharged to the other axial side. In the following description, the axial air intake side will be referred to as "upper" and the axial air discharge side will be referred to as "lower" for the sake of convenience.

In the present preferred embodiment, the bearings preferably include a pair of axially spaced-apart bearing units 50a and 50b. The rotor magnets 20 and the stator 30 are preferably arranged axially between the bearing units 50a and 50b. The bearing units 50a and 50b and the stator 30 are fixed to the inner circumferential surface of the holder unit 40.

In this regard, the impeller 60 preferably includes a substantially cylindrical impeller cup 61 arranged to rotate together with the shaft 10 and a plurality of blades 62 defined on the outer circumferential surface of the impeller cup 61. The rotor magnets 20 are fixed to the outer circumferential surface of the shaft 10 to rotate about the rotation axis J together with the shaft 10. Alternatively, the rotor magnets 20 may be indirectly fixed to the outer circumferential surface of the shaft 10 through an intervening member, if so desired. The holder unit 40 is preferably connected to a housing 70 through connecting members 80.

In the blower fan 100 configured as described above, as indicated by circles in FIG. 1, specified spaces are provided radially outwards of the rotation axis J, only between the rotor magnets 20 and the stator 30, between the holder unit 40 and the impeller cup 61, and between the blades 62 and the housing 70. Accordingly, as compared with the conventional inner rotor type blower fan, it is possible to reduce the total number of spaces provided between rotating bodies and non-rotating bodies and, consequently, to reduce the radial dimension of the blower fan 100. As a result, it becomes possible to secure a sufficient wind-tunnel area and to realize an inner rotor type blower fan 100 having a reduced size and exhibiting an enhanced cooling capacity.

Figure 2:
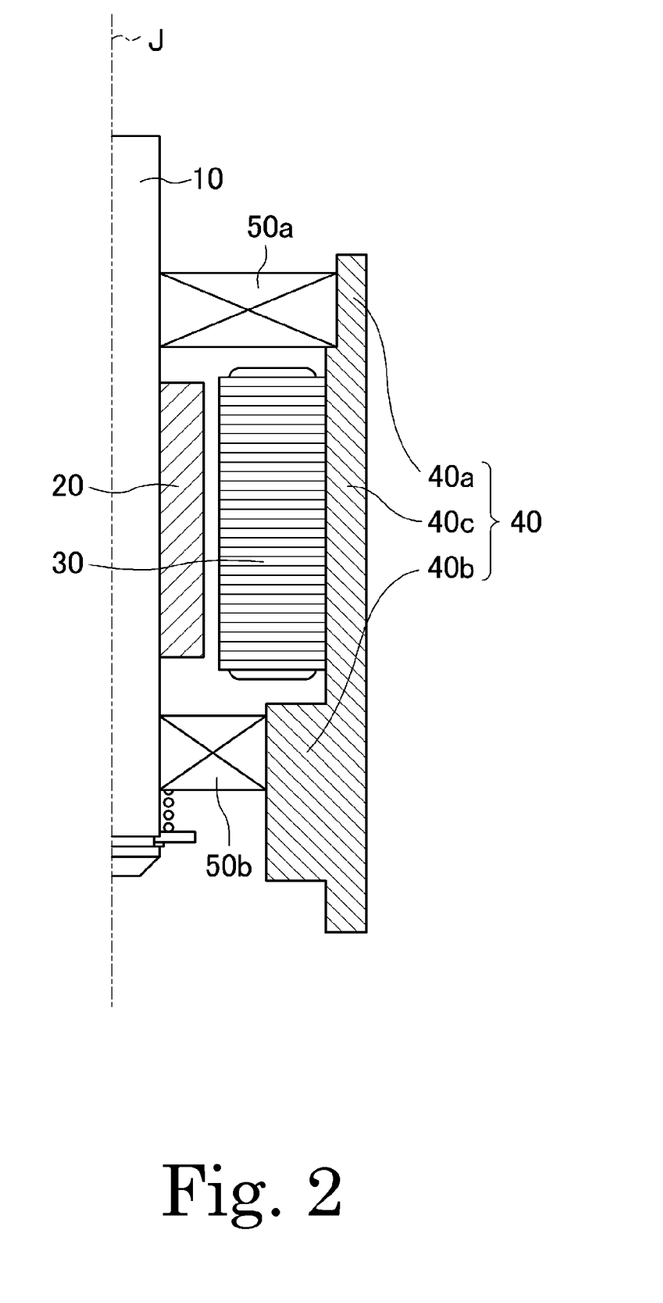
FIG. 2 is a partially-enlarged half section view of a portion of the blower fan shown in FIG. 1.

FIG. 2 is a partially-enlarged half section view of a portion of the blower fan 100 shown in FIG. 1. Referring to FIG. 2, the inner diameter of a portion 40a of the holder unit 40 arranged to hold the bearing unit 50a (hereinafter referred to as "upper bearing unit 50a") is preferably substantially equal to or greater than the diameter of a portion 40c of the holder unit 40 arranged to hold the stator 30. Thus, a motor unit of the blower fan 100 can be easily assembled in an assembling process of the blower fan 100 by, for example, bonding, welding, or press-fitting the bearing 50b (hereinafter referred to as "lower bearing unit 50b") to the portion 40b of the holder unit 40 arranged to hold the lower bearing unit 50b from the axial lower side, for example, bonding, welding, or press-fitting the stator 30 to the portion 40c of the holder unit 40 arranged to hold the stator 30 from the axial upper side and then, for example, bonding, welding, or press-fitting the upper bearing unit 50a to the portion 40a of the holder unit 40 arranged to hold the upper bearing unit 50a from the axial upper side.

In this connection, it is preferred that at least the portions 40a and 40b of the holder unit 40 arranged to hold the bearing units 50a and 50b and the portion 40c of the holder unit 40 arranged to hold the stator 30 be continuously defined by a single monolithic piece, for example. This makes it possible to increase precision of the coaxiality of each of the bearing units 50a and 50b and the stator 30.

It is also preferred that the radial thickness of the portion 40c of the holder unit 40 arranged to hold the stator 30 be greater than the radial thickness of at least the portion 40a of the holder unit 40 arranged to hold one of the bearing units 50a and 50b (the upper bearing unit 50a in the present preferred embodiment). This makes it possible to prevent the portion 40c of the holder unit 40 from being deformed when, for example, press-fitting the stator 30 to the portion 40c. Consequently, it is possible to minimize and/or eliminate deformation of the portion 40a of the holder unit 40 arranged to hold the upper bearing unit 50a.

It is also preferred that the outer diameter of the holder unit 40 be constant or substantially constant in the axial direction. Thus, the outer circumferential surface of the holder unit 40 extends straight in the axial direction, which makes it easy to process the outer circumferential surface of the holder unit 40.

In the present preferred embodiment, the material of the holder unit 40 is not particularly limited. For example, if at least the portions 40a, 40b and 40c of the holder unit 40 arranged to hold the bearing units 50a and 50b and the stator 30 are made from a metallic member, e.g., a brass member, it becomes possible to increase the holding strength of the bearing units 50a and 50b and the stator 30. In this case, it is preferred that the metallic member defining the holder unit 40 be jointed to the housing 70 by, for example, being embedded in the housing through an insert molding method. It is also preferred that the radial thickness of the portion of the holder unit 40 connected to the connecting members 80 (the portion 40b arranged to hold the lower bearing unit 50b in the present preferred embodiment) be greater than the radial thickness of the remaining portions of the holder unit 40 (the portions 40a and 40c arranged to hold the upper bearing unit 50a and the stator 30 in the present preferred embodiment). This makes it possible to prevent the portion 40b of the holder unit 40 from being deformed by the injecting pressure of a molten resin when insert-molding the holder unit 40 with the housing 70.

Next, one example of a method of assembling the blower fan 100 according to the present preferred embodiment will be described with reference to FIGS. 3 through 5.

Figure 3:
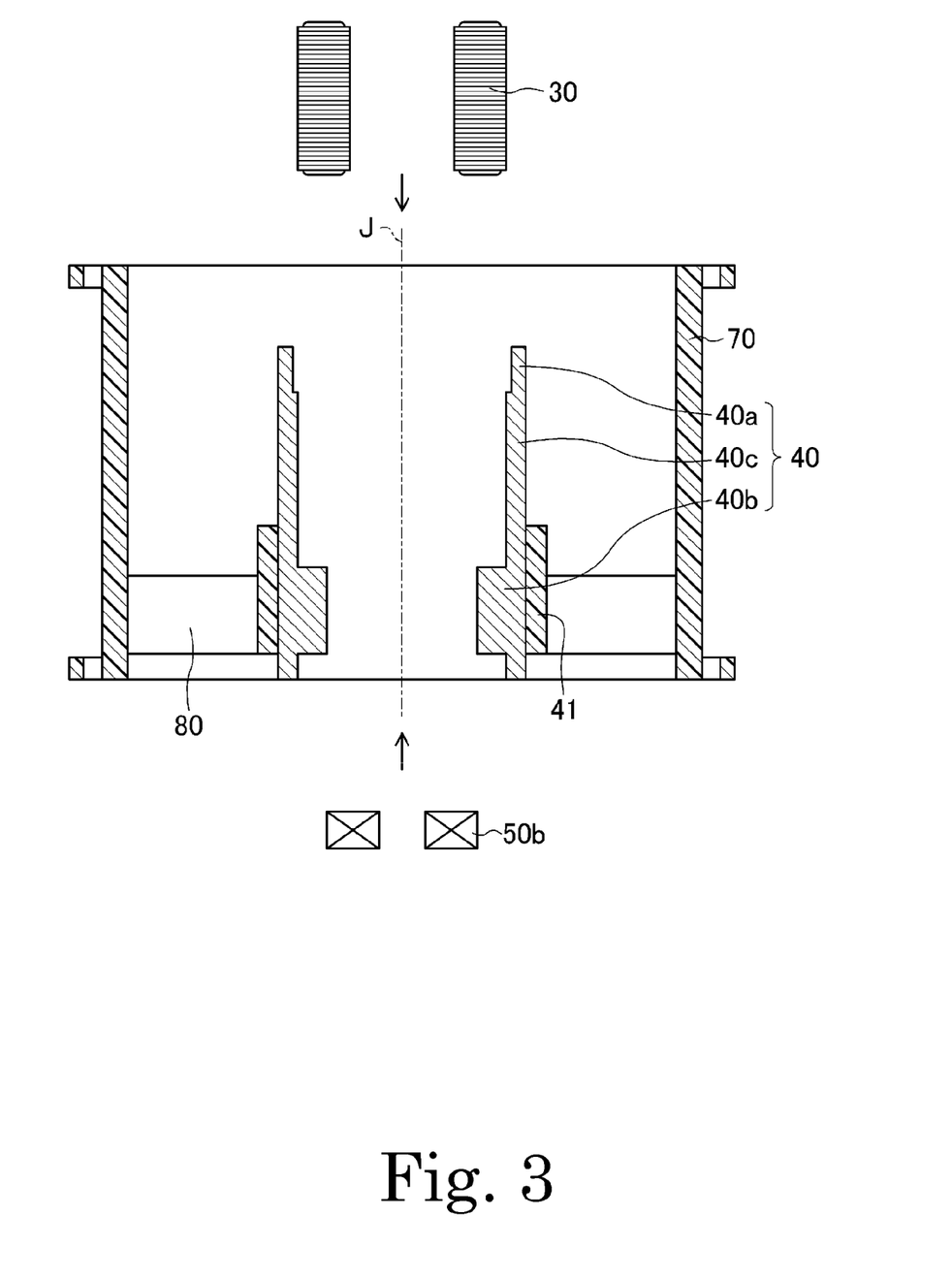
FIGS. 3 to 5 are section views illustrating an example of a method of assembling the blower fan according to a preferred embodiment of the present invention.

First, the holder unit 40, which preferably has a substantially cylindrical shape, is prepared as illustrated in FIG. 3. In this regard, the inner circumferential surface of the holder unit 40 preferably is formed to have a size such that the inner diameters of the portions 40a, 40b, and 40c arranged to hold the bearing units 50a and 50b and the stator 30 are respectively matched with the outer diameters of the bearing units 50a and 50b and the stator 30. In the present preferred embodiment, the inner diameter of the portion 40a arranged to hold the upper bearing unit 50a is set substantially equal to or greater than the inner diameter of the portion 40c arranged to hold the stator 30. The inner diameter of the portion 40b arranged to hold the lower bearing unit 50b is preferably smaller than the inner diameter of the portion 40c arranged to hold the stator 30. The holder unit 40 is preferably made from, for example, a metallic member and is preferably insert-molded with the housing 70 through a resin bush 41 and the connecting members 80.

From the axial upper side of the holder unit 40, the stator 30 is preferably, for example, press-fitted to the inner circumferential surface of the portion 40c of the holder unit 40 arranged to hold the stator 30, whereby the stator 30 is fixed to the holder unit 40.

From the axially lower side of the holder unit 40, the lower bearing unit 50b is fitted to the inner circumferential surface of the portion 40b of the holder unit 40 arranged to hold the lower bearing unit 50b.

Figure 4:
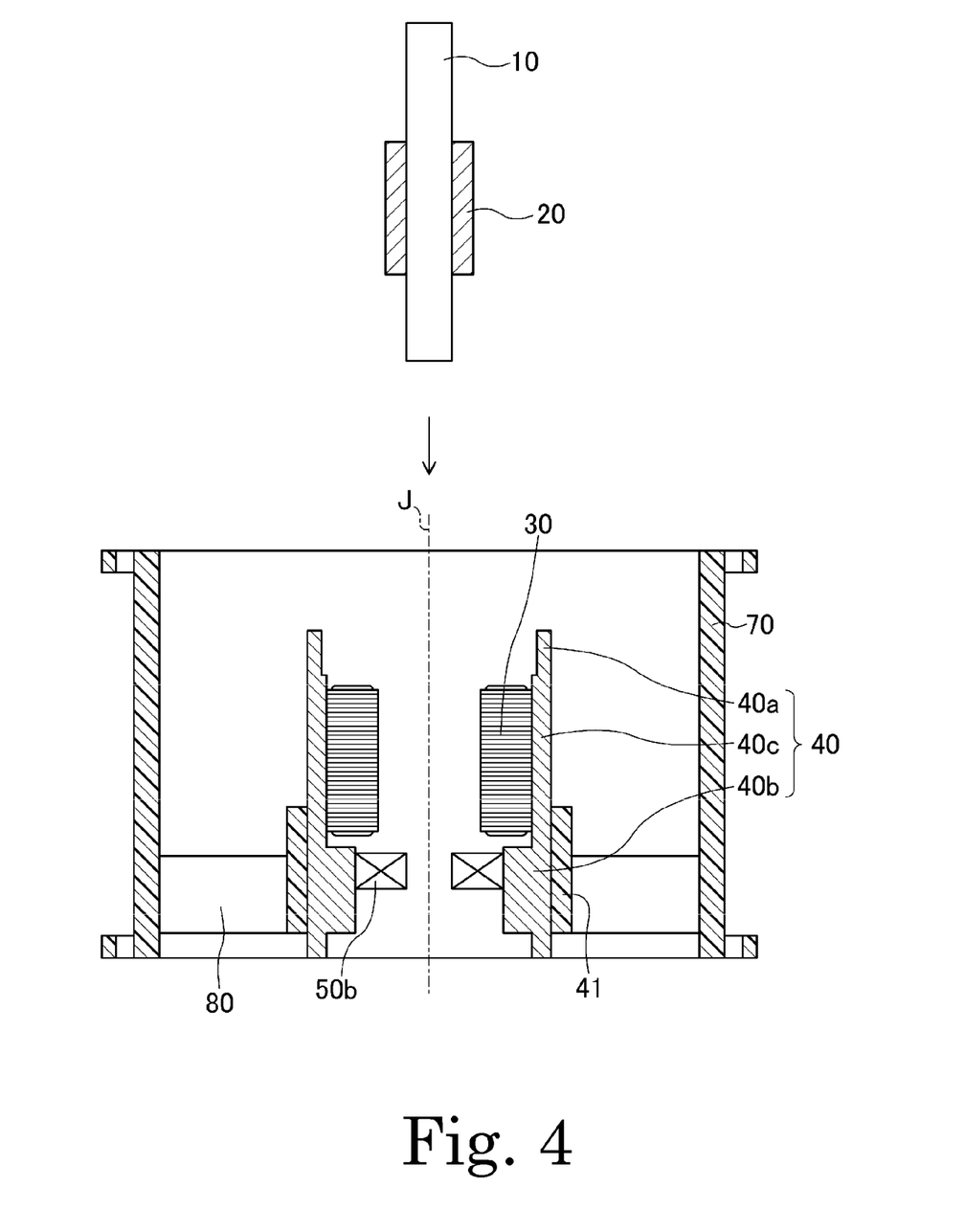

Next, from the axially upper side of the holder unit 40, an assembly of the shaft 10 and the rotor magnets 20 is fitted to the inner circumferential surface of the lower bearing unit 50b as illustrated in FIG. 4.

Figure 5:
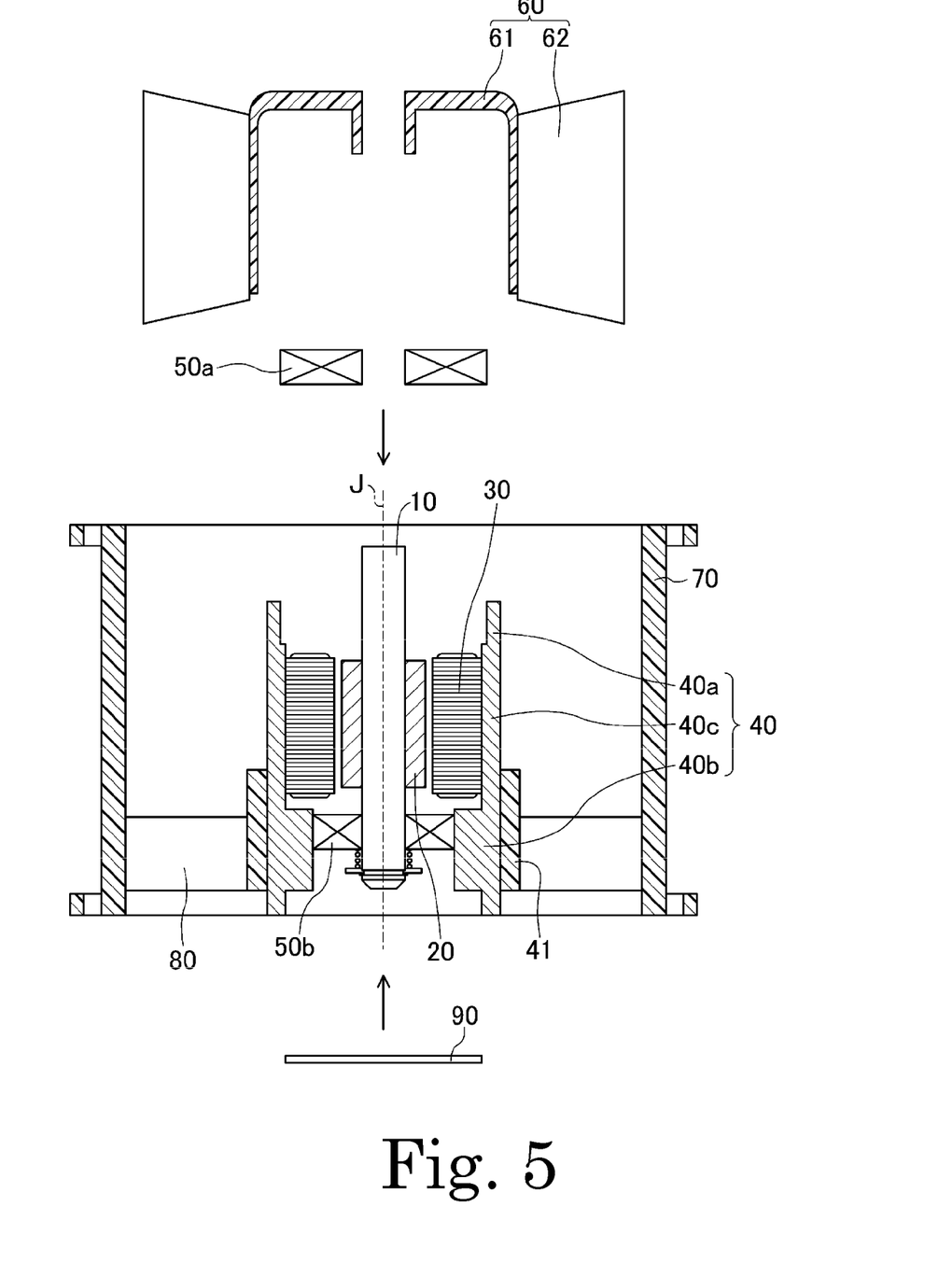

Then, from the axial upper side of the holder unit 40, the upper bearing unit 50a is fitted and bonded to the inner circumferential surface of the portion 40a of the holder unit 40 arranged to hold the upper bearing unit 50a as illustrated in FIG. 5, whereby the upper bearing unit 50a is fixed to the holder unit 40. Since the inner diameter of the portion 40a arranged to hold the upper bearing unit 50a is preferably set equal to, substantially equal to, or greater than the inner diameter of the portion 40c arranged to hold the stator 30, it becomes possible to fix the upper bearing unit 50a to the holder unit 40 at this time.

Subsequently, as shown in FIG. 5, the impeller 60 including the impeller cup 61 and the blades 62 defined on the outer circumferential surface of the impeller cup 61 is preferably, for example, press-fitted to the shaft 10 such that the impeller 60 is thereby firmly and rotatably fixed to the shaft 10.

Finally, as illustrated in FIG. 5, a spring and a retainer ring are fixed to the shaft 10 below the lower bearing unit 50b. Thereafter, from the axially lower side of the holder unit 40, a circuit board 90 is inserted into and fixed to the holder unit 40. This completes the blower fan 100 shown in FIG. 1.

The inner rotor type blower fan according to a preferred embodiment of the present invention is characterized by the configuration in which the rotor magnets 20 as rotating bodies are arranged between the bearing units 50a and 50b, the stator 30 as a non-rotating body is arranged radially outwards of the rotor magnets 20 and, the bearing units 50a and 50b and the stator 30 are held on the inner circumferential surface of the substantially cylindrical holder unit 40.

This configuration is not limited to the present preferred embodiment illustrated in FIG. 1 but may be modified in many different forms. Hereinafter, modified examples of the present preferred embodiment will be described with reference to FIGS. 6 through 10.

Figure 6:
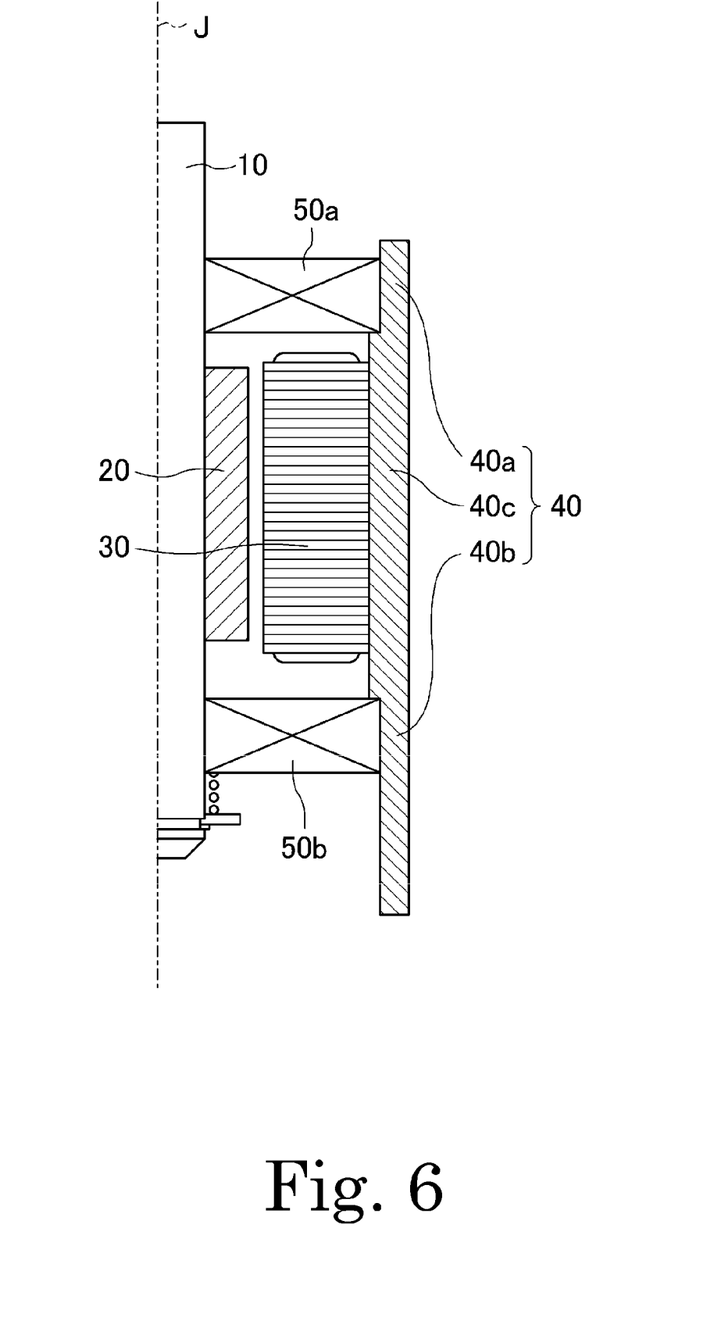
FIG. 6 is a partially-enlarged half section view showing the configuration of a blower fan according to one modified example of a preferred embodiment of the present invention.

FIG. 6 is a partially-enlarged half section view showing the configuration of a blower fan according to one modified example of the above described preferred embodiment of the present invention. In the modified example shown in FIG. 6, the outer diameters of the bearing units 50a and 50b are preferably equal or substantially equal to each other and greater than the outer diameter of the stator 30. This makes it possible to provide the bearing units 50a and 50b with an identical shape, thereby reducing the number of parts required by the blower fan.

In the present modified example, the inner diameter of the portion 40a of the holder unit 40 arranged to hold the upper bearing unit 50a is preferably greater than the inner diameter of the portion 40c arranged to hold the stator 30. From the axial upper side of the holder unit 40, the stator 30 is preferably, for example, press-fitted to the portion 40c of the holder unit 40 arranged to hold the stator 30, after which the upper bearing unit 50a can preferably be, for example, bonded, welded, or press-fitted to the portion 40a of the holder unit 40 arranged to hold the upper bearing unit 50a.

The radial thickness of the portion 40c of the holder unit 40 arranged to hold the stator 30 is preferably greater than the radial thickness of the portion 40a of the holder unit 40 arranged to hold the upper bearing unit 50a. This makes it possible to prevent or substantially prevent the portion 40c from being deformed when, for example, press-fitting the stator 30 to the portion 40c. Consequently, it is possible to prevent or substantially prevent deformation of the portion 40a of the holder unit 40 arranged to hold the upper bearing unit 50a.

The radial thickness 40c of the holder unit 40 arranged to hold the stator 30 is preferably greater than the radial thickness of the portions 40a and 40b of the holder unit 40 arranged to hold the bearing units 50a and 50b. This makes it possible to bring the axially opposite ends of the portion 40c of the holder unit 40 arranged to hold the stator 30 into contact with the respective bearing units 50a and 50b. Accordingly, it is possible to readily restrict the axial positions of the bearing units 50a and 50b.

Figure 7:
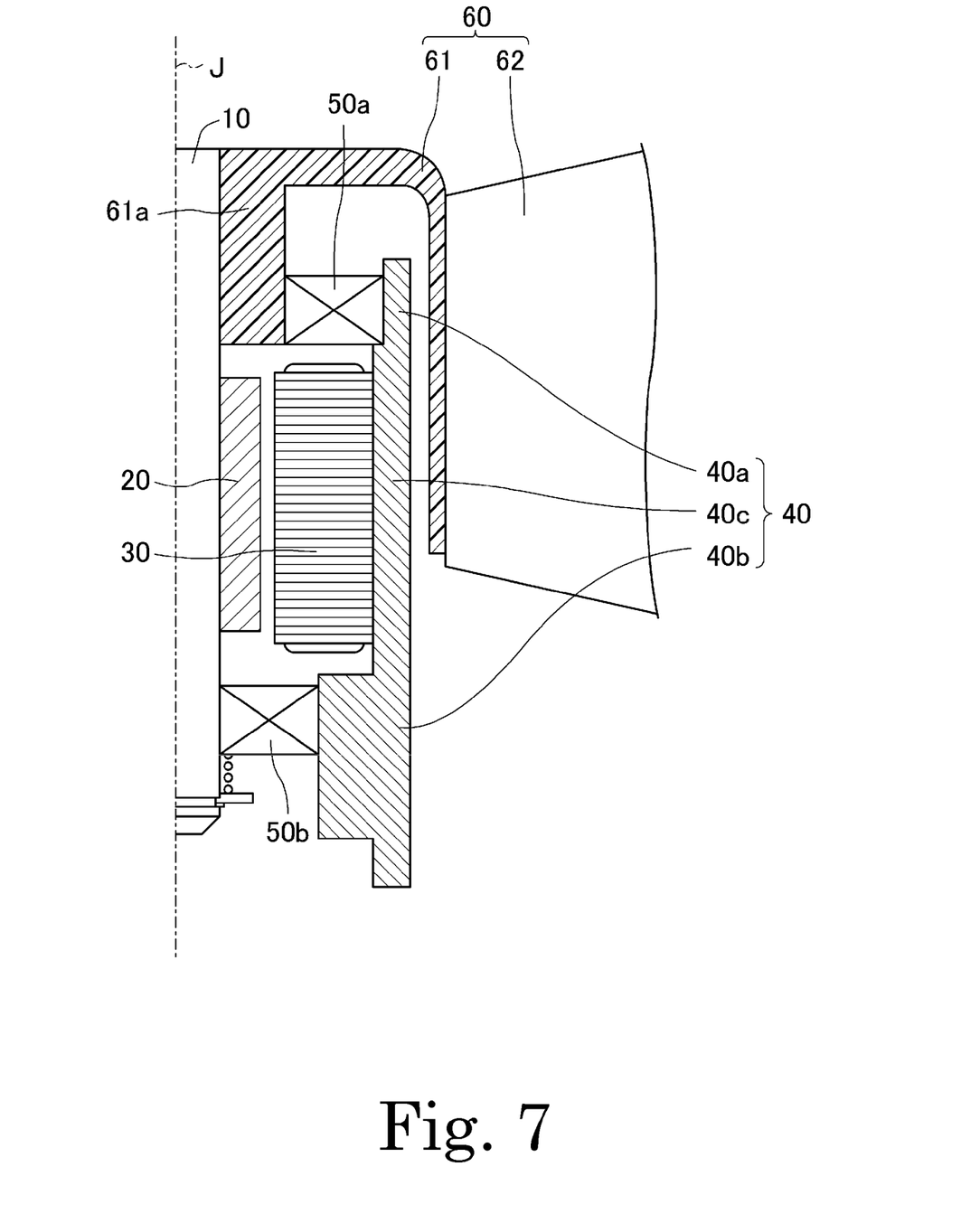
FIG. 7 is a partially-enlarged half section view showing the configuration of a blower fan according to another modified example of a preferred embodiment of the present invention.

FIG. 7 is a partially-enlarged half section view showing the configuration of a blower fan according to another modified example of the above described preferred embodiment of the present invention. In the modified example shown in FIG. 7, the inner diameter of the upper bearing unit 50a is preferably greater than the inner diameter of the lower bearing unit 50b. In this case, the impeller 60 is fixed to the shaft 10 preferably by, for example, press-fitting a boss portion 61a provided in the central area of the impeller cup 61 to the shaft 10. The upper bearing unit 50a is fixed to the outer circumferential surface of the boss portion 61a of the impeller cup 61. In this regard, the bearing units 50a and 50b are arranged to have the same radial thickness. This makes it possible to increase the degree of freedom in selecting bearings and, consequently, to increase the degree of freedom in design in view of, e.g., the price, lifespan, and permissible amount of shaft damage.

Figure 8:
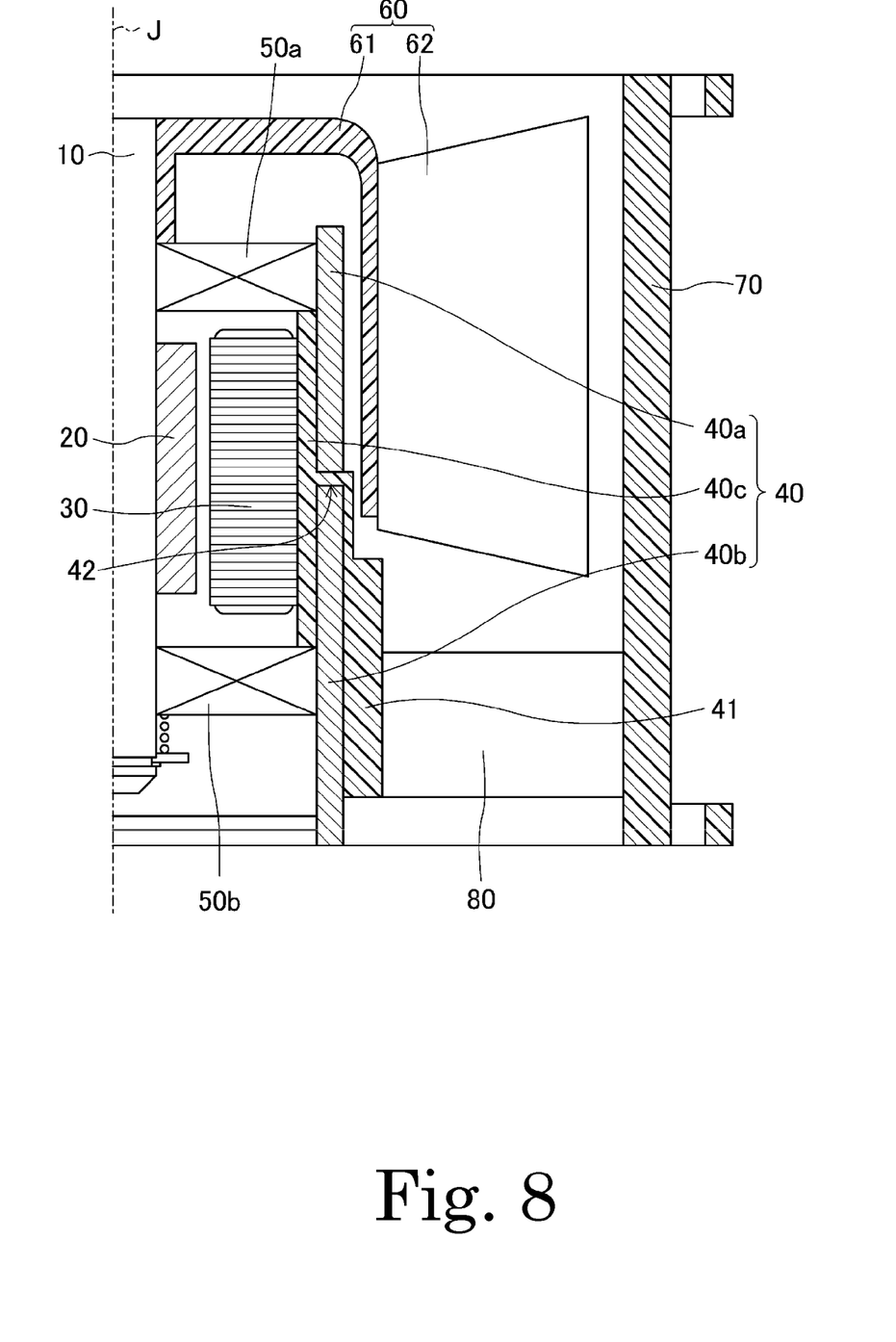
FIG. 8 is a partially-enlarged half section view showing the configuration of a blower fan according to a further modified example of a preferred embodiment of the present invention.

FIG. 8 is a partially-enlarged half section view showing the configuration of a blower fan according to a further modified example of the above described preferred embodiment of the present invention. In the modified example shown in FIG. 8, the outer diameters of the bearing units 50a and 50b are equal or substantially equal to each other and greater than the outer diameter of the stator 30. The portions 40a and 40b of the holder unit 40 arranged to hold the bearing units 50a and 50b are preferably made from, for example, a metallic member.

The holder unit 40 is connected to the housing 70 through the resin bush 41 and the connecting members 80. The metallic member is jointed to the housing 70 preferably through, for example, an insert molding method. The portion 40c of the holder unit 40 arranged to hold the stator 30 makes contact with the radial inner surface of the metallic member and is preferably made of a resin to define a continuously-extending single monolithic body with the housing 70. The portion 40c of the holder unit 40 arranged to hold the stator 30 can be provided by defining a radially-extending hole 42 in the metallic member and allowing a molten resin material to flow radially inwards through the hole 42 during the insert-molding process.

In the present modified example, the metallic member defining the portions 40a and 40b of the holder unit 40 arranged to hold the bearing units 50a and 50b can be formed into a cylindrical shape preferably by, for example, a pressing work. This makes it possible to increase the precision of the coaxiality of the bearing units 50a and 50b. Since the resin defining the portion 40c of the holder unit 40 arranged to hold the stator 30 is arranged to be in contact with the radial inner surface of the metallic member, the axial opposite ends of the portion 40c of the holder unit 40 arranged to hold the stator 30 can be brought into contact with the bearing units 50a and 50b. This makes it possible to readily restrict the axial positions of the bearing units 50a and 50b.

Figure 9:
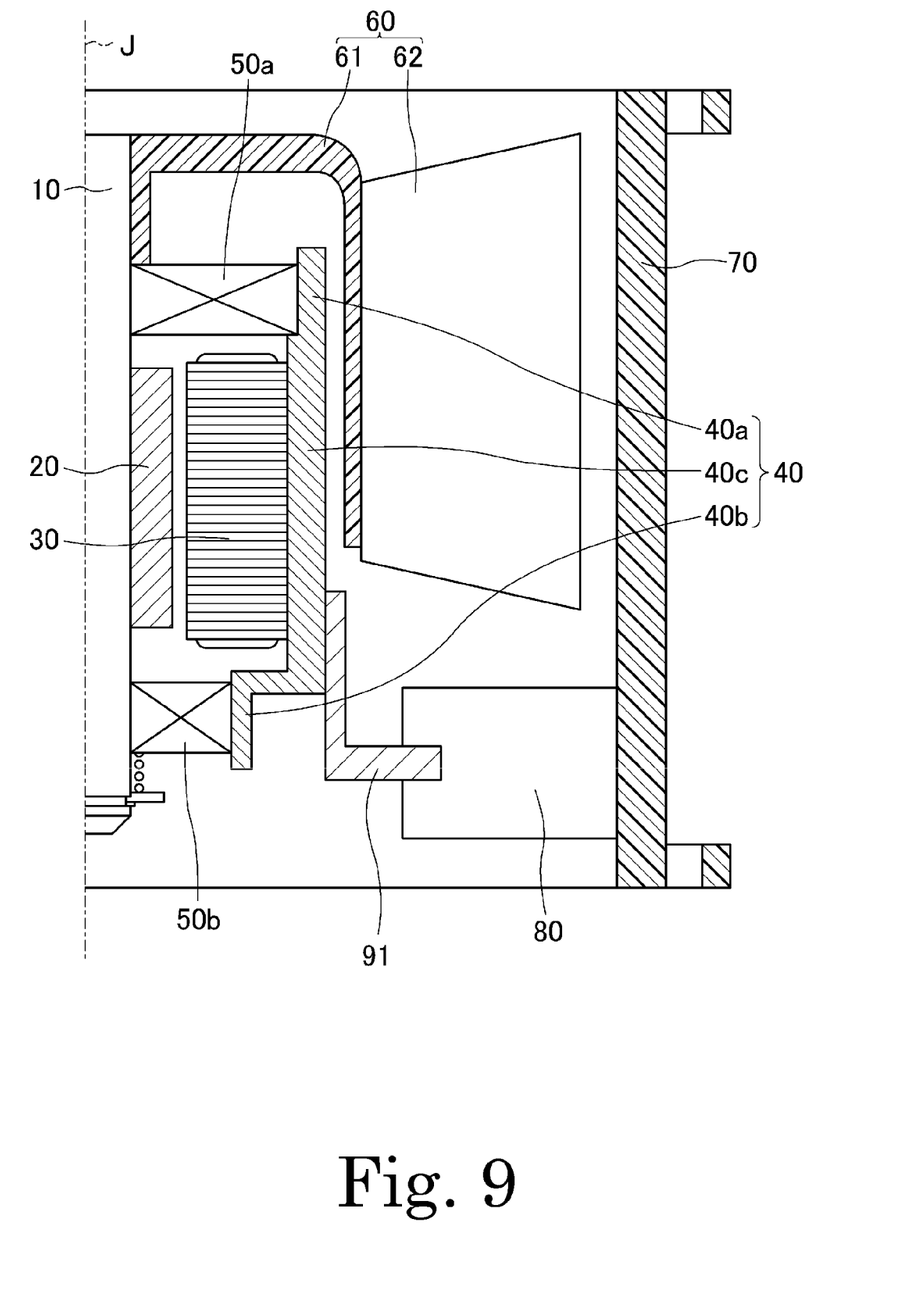
FIG. 9 is a partially-enlarged half section view showing the configuration of a blower fan according to a still further modified example of a preferred embodiment of the present invention.

FIG. 9 is a partially-enlarged half section view showing the configuration of a blower fan according to a still further modified example of the above preferred embodiment of the present invention. In the modified example shown in FIG. 9, the portion 40b of the holder unit 40 arranged to hold the lower bearing unit 50b is preferably formed by, for example, a burring process. The portion 40b of the holder unit 40 arranged to hold the lower bearing unit 50b formed in this process extends radially from the portion 40c of the holder unit 40 arranged to hold the stator 30 and preferably has a substantially L-shaped form. This makes it possible to manufacture the holder unit 40 in a cost-effective manner as compared with a cutting process, etc.

The outer circumference of the holder unit 40 is held in place by a retainer member 91 which is in turn connected to the housing 70 through the connecting members 80 preferably by, for example, insert molding.

Figure 10:
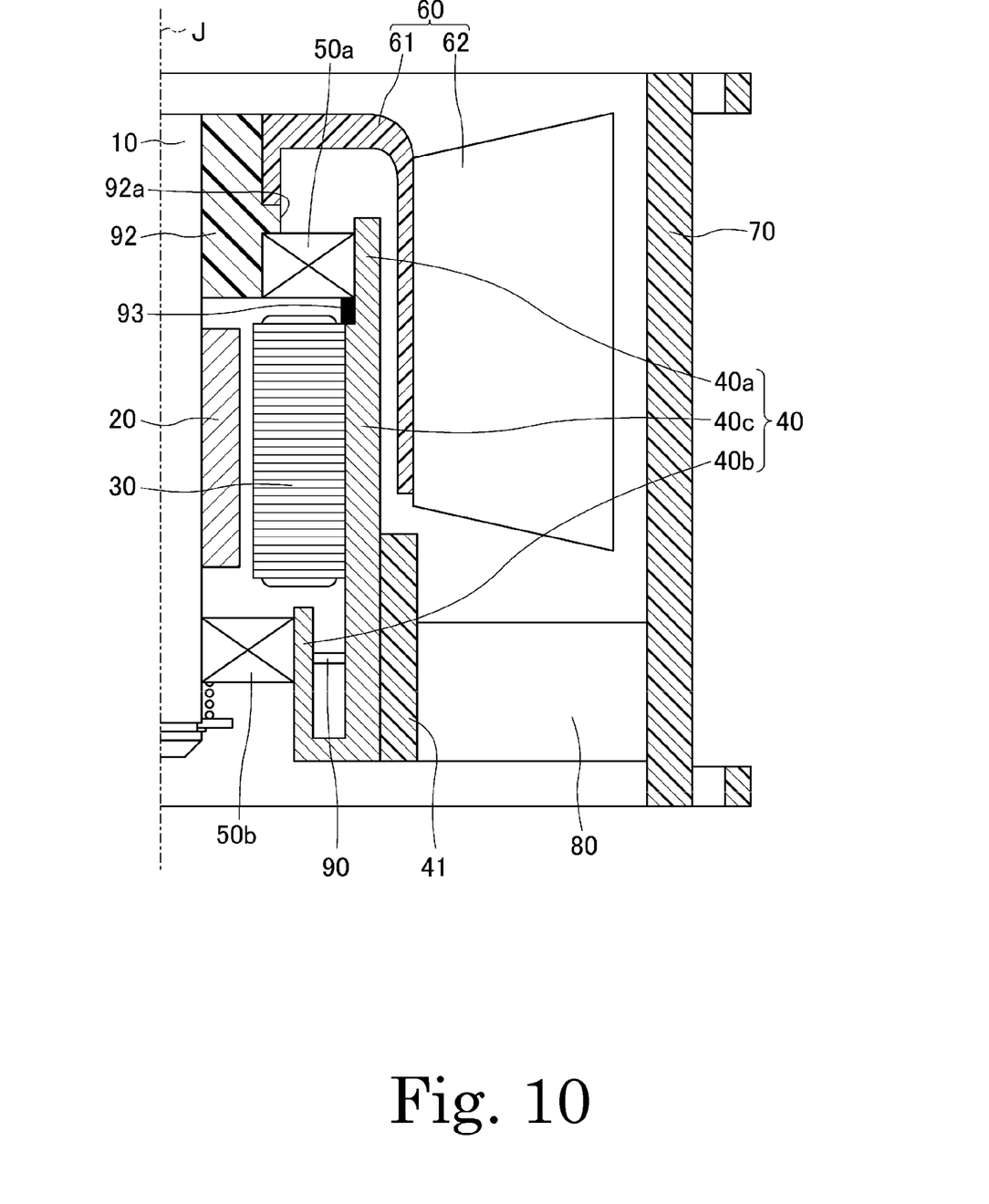
FIG. 10 is a partially-enlarged half section view showing the configuration of a blower fan according to a yet still further modified example of a preferred embodiment of the present invention.

FIG. 10 is a partially-enlarged half section view showing the configuration of a blower fan according to yet another further modified example of the above preferred embodiment of the present invention. In the modified example shown in FIG. 10, the portion 40b of the holder unit 40 arranged to hold the lower bearing unit 50b has an inwardly-curved shape. This makes it possible to prevent the portion 40b from being deformed by the injection pressure of a molten resin in cases where the holder unit 40 is insert-molded with the housing 70.

By forming the portion 40b of the holder unit 40 arranged to hold the lower bearing unit 50b to have an inwardly-curved shape, it is also possible to arrange a circuit board 90 within the internal space defined by the curved portion 40b.

A bush 92 is preferably provided between the shaft 10 and the inner circumferential surface of the upper bearing unit 50a, whereby the radial thickness of the bearing units 50a and 50b can be made equal or substantially equal to each other. An annular protrusion 92a protruding radially outwards is preferably provided on a portion of the outer circumferential surface of the bush 92. This makes it possible to easily locate the impeller cup 61 and the upper bearing unit 50a.

A spacer 93 is provided between the stator 30 and the upper bearing unit 50a. This makes it possible to easily restrict the axial position of the upper bearing unit 50a.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A blower fan, comprising:
a shaft;
a rotor magnet arranged to rotate about a rotation axis together with the shaft;
a stator arranged radially outwards of the rotor magnet in an opposing relationship with the rotor magnet;
a substantially cylindrical holder unit arranged to rotatably support the shaft through a bearing, an inner surface of the holder unit directly contacting the stator along an entire axial extent of the stator;
an impeller arranged to rotate together with the shaft; and
a housing arranged to surround the impeller and the holder unit; wherein
the bearing includes a pair of axially spaced-apart bearing units, the rotor magnet and the stator are arranged axially between the bearing units, and the bearing units and the stator being held on an inner circumferential surface of the holder unit;
the housing is directly connected to the holder unit through a plurality of connecting members, at least one of the plurality of connecting members overlapping one of the pair of axially spaced-apart bearing units in a radial direction; and
a radially outermost portion of at least one of the bearing units contacts the substantially cylindrical holder unit at a position which is radially outward from a radially outermost portion of the stator.

2. The blower fan of claim 1, wherein the holder unit includes a pair of portions arranged to hold the bearing units and a portion holding the stator, an inner diameter of at least one of the portions arranged to hold the bearing units being equal to, substantially equal to, or greater than the inner diameter of the portion holding the stator.

3. The blower fan of claim 1, wherein the rotor magnet is fixed to an outer circumferential surface of the shaft.

4. The blower fan of claim 1, wherein the holder unit includes a pair of portions holding the bearing units and a portion holding the stator, a radial thickness of the portion holding the stator being greater than a radial thickness of at least one of the portions holding the bearing units.

5. The blower fan of claim 1, wherein the holder unit includes a pair of portions arranged to hold the bearing units and a portion arranged to hold the stator, each of the pair of portions and the portion being continuous with one another to define a single monolithic piece.

6. The blower fan of claim 5, wherein at least one of the portions arranged to hold the bearing units and the portion arranged to hold the stator is provided by a metallic member.

7. The blower fan of claim 6, wherein the housing is made of a resin and the metallic member is at least partially embedded within the housing.

8. The blower fan of claim 1, wherein
the housing is made of a resin, the holder unit includes a pair of portions arranged to hold the bearing units and a portion arranged to hold the stator, at least the pair of portions arranged to hold the bearing units being defined by a metallic member, the metallic member being joined to the housing by being at least partially embedded within the housing, the portion arranged to hold the stator being made of a resin and being kept in contact with a radial inner surface of the metallic member, and the portion arranged to hold the stator and the housing being continuously defined by a single monolithic piece.

9. The blower fan of claim 8, wherein the portion arranged to hold the stator includes axially opposite ends each making contact with respective ones of the bearing units.

10. The blower fan of claim 7, wherein the holder unit includes a portion connected to the housing through a connecting member.

11. The blower fan of claim 10, wherein a radial thickness of the portion connected to the housing through the connecting member is greater than a radial thickness of remaining portions of the holder unit.

12. The blower fan of claim 1, wherein an outer diameter of one of the bearing units is greater than an outer diameter of the stator, an outer diameter of the other bearing unit being smaller than the outer diameter of the stator.

13. The blower fan of claim 12, wherein an inner diameter of the one of the bearing units is greater than an inner diameter of the other bearing unit.

14. The blower fan of claim 13, wherein the bearing units have the same radial thickness.

15. The blower fan of claim 13, further comprising:
a bush provided between the shaft and an inner circumferential surface of the one of the bearing units.

16. The blower fan of claim 1, wherein the bearing units have the same outer diameter, the outer diameter of the bearing units being greater than the outer diameter of the stator.

17. The blower fan of claim 1, further comprising:
a spacer provided between the stator and at least one of the bearing units.

18. The blower fan of claim 1, wherein an outer diameter of the holder unit is constant or substantially constant in an axial direction.

19. The blower fan of claim 1, wherein
the holder unit is connected to the housing through both a retainer member and the plurality of connecting members.

20. The blower fan of claim 1, wherein the holder unit includes a portion arranged to hold one of the bearing units positioned axially lower than the other bearing unit, the portion arranged to hold the lower bearing unit being bent or curved radially inwards.

* * * * *